United States Patent
Inglis et al.

(10) Patent No.: US 12,086,070 B2
(45) Date of Patent: Sep. 10, 2024

(54) BLOCK DEVICE INTERFACE USING NON-VOLATILE PINNED MEMORY

(71) Applicant: Daedalus Cloud LLC, Croton-on-Hudson, NY (US)

(72) Inventors: Stuart John Inglis, Cambridge (NZ); Timothy Kelly Dawson, Cambridge (NZ); Xavier Aldren Simmons, Cambridge (NZ); Sheridan John Lambert, Cambridge (NZ); Rafael John Patrick Shuker, Cambridge (NZ); Dominic Joseph Michael Houston Azaris, Cambridge (NZ); Alexander Kingsley St. John, Cambridge (NZ)

(73) Assignee: DAEDALUS CLOUD LLC, Croton-on-Hudson, NY (US)

( * ) Notice: Subject to any disclaimer, the term of this patent is extended or adjusted under 35 U.S.C. 154(b) by 0 days.

(21) Appl. No.: 17/579,264

(22) Filed: Jan. 19, 2022

(65) Prior Publication Data

US 2022/0138111 A1    May 5, 2022

Related U.S. Application Data (63) Continuation of application No. 16/556,575, filed on Aug. 30, 2019, now Pat. No. 11,263,144.
(Continued)

(51) Int. Cl.
*G06F 12/10* (2016.01)
*G06F 3/06* (2006.01)
(Continued)

(52) U.S. Cl.
CPC ............ *G06F 12/10* (2013.01); *G06F 3/0607* (2013.01); *G06F 3/065* (2013.01);
(Continued)

(58) Field of Classification Search
None
See application file for complete search history.

(56) References Cited

U.S. PATENT DOCUMENTS 5,282,274 A    1/1994    Liu
5,459,857 A    10/1995   Ludlam et al.
(Continued)

FOREIGN PATENT DOCUMENTS

CN    104410725 A    3/2015
CN    107102957 A    8/2017
(Continued)

OTHER PUBLICATIONS

Simmons, Xavier Aldren, et al., "Vector Processor Storage," filed Aug. 30, 2019, U.S. Appl. No. 16/556,711.
(Continued)

*Primary Examiner* — Michael Alsip
(74) *Attorney, Agent, or Firm* — Ascenda Law Group, PC (57) ABSTRACT

A method includes receiving, at a block device interface, an instruction to write data, the instruction comprising a memory location of the data; copying the data to pinned memory; performing, by a vector processor, one or more invertible transforms on the data; and writing the data from the pinned memory to one or more storage devices asynchronously. The pinned memory of the data corresponds to a location in pinned memory, the pinned memory being accessible by the vector processor and one or more other processors.

11 Claims, 6 Drawing Sheets

Related U.S. Application Data (60) Provisional application No. 62/746,981, filed on Oct. 17, 2018, provisional application No. 62/725,703, filed on Aug. 31, 2018, provisional application No. 62/725,691, filed on Aug. 31, 2018.

(51) Int. Cl.

| | | |
|---|---|---|
| *G06F 9/30* | (2018.01) | |
| *G06F 9/38* | (2018.01) | |
| *G06F 11/10* | (2006.01) | |
| *G06F 12/02* | (2006.01) | |
| *G06F 12/0815* | (2016.01) | |
| *G06F 12/12* | (2016.01) | |
| *G06F 12/14* | (2006.01) | |

(52) U.S. Cl.
CPC ...... *G06F 9/30036* (2013.01); *G06F 9/30123* (2013.01); *G06F 9/3877* (2013.01); *G06F 11/1004* (2013.01); *G06F 11/1088* (2013.01); *G06F 12/0246* (2013.01); *G06F 12/0815* (2013.01); *G06F 12/12* (2013.01); *G06F 12/1408* (2013.01); *G06F 3/0679* (2013.01); *G06F 2212/1052* (2013.01); *G06F 2212/657* (2013.01)

(56) References Cited

U.S. PATENT DOCUMENTS

| | | | |
|---|---|---|---|
| 5,502,836 | A | 3/1996 | Hale et al. |
| 6,467,016 | B1 | 10/2002 | Kanai |
| 7,822,856 | B2 | 10/2010 | Zuckerman et al. |
| 9,092,152 | B1 | 7/2015 | Piszczek et al. |
| 9,116,621 | B1 | 8/2015 | Pintiysky et al. |
| 9,158,927 | B1 | 10/2015 | Franklin et al. |
| 9,164,702 | B1 | 10/2015 | Nesbit et al. |
| 9,268,640 | B1 | 2/2016 | Foley et al. |
| 9,571,125 | B2 | 2/2017 | Lee et al. |
| 9,639,457 | B1 | 5/2017 | Piszczek et al. |
| 9,779,035 | B1 | 10/2017 | Patiejunas |
| 9,823,968 | B1 | 11/2017 | Fugini et al. |
| 10,152,376 | B2 | 12/2018 | Danilov et al. |
| 10,739,996 | B1 | 8/2020 | Ebsen et al. |
| 10,783,022 | B2 | 9/2020 | Danilov et al. |
| 11,115,057 | B2 | 9/2021 | Danilov et al. |
| 11,263,144 | B2 | 3/2022 | Inglis et al. |
| 11,263,145 | B2 | 3/2022 | Simmons et al. |
| 11,347,653 | B2 | 5/2022 | Inglis et al. |
| 2004/0123032 | A1 | 6/2004 | Talagala et al. |
| 2005/0080990 | A1 | 4/2005 | Mereddy et al. |
| 2006/0212782 | A1 | 9/2006 | Li |
| 2007/0168632 | A1 | 7/2007 | Zeevi et al. |
| 2008/0086620 | A1 | 4/2008 | Morris |
| 2009/0203430 | A1 | 8/2009 | Peek |
| 2009/0235014 | A1 | 9/2009 | Yim et al. |
| 2009/0268903 | A1 | 10/2009 | Bojinov et al. |
| 2010/0037056 | A1 | 2/2010 | Follis et al. |
| 2011/0126045 | A1 | 5/2011 | Bennett |
| 2012/0268469 | A1 | 10/2012 | Shchepetov et al. |
| 2013/0016109 | A1 | 1/2013 | Garanzha |
| 2013/0067174 | A1 | 3/2013 | Moss et al. |
| 2014/0006850 | A1 | 1/2014 | Aliev et al. |
| 2014/0046908 | A1 | 2/2014 | Patiejunas et al. |
| 2014/0075104 | A1 | 3/2014 | Buswell |
| 2014/0281364 | A1 | 9/2014 | Buschardt et al. |
| 2014/0325117 | A1 | 10/2014 | Canepa et al. |
| 2015/0205663 | A1 | 7/2015 | Sundaram et al. |
| 2015/0325315 | A1 | 11/2015 | Rakitzis et al. |
| 2017/0061566 | A1 | 3/2017 | Min et al. |
| 2017/0132151 | A1 | 5/2017 | Bakke et al. |
| 2017/0147516 | A1* | 5/2017 | De .................. G06F 13/28 |
| 2017/0206033 | A1 | 7/2017 | Ma et al. |
| 2017/0228313 | A1 | 8/2017 | Boitei |
| 2017/0272209 | A1 | 9/2017 | Yanovsky et al. |
| 2018/0004413 | A1 | 1/2018 | Zhang |
| 2018/0150347 | A1* | 5/2018 | Chinnakkonda Vidyapoornachary ..................... G06F 11/073 |
| 2018/0173420 | A1 | 6/2018 | Li et al. |
| 2018/0181324 | A1 | 6/2018 | Danilov et al. |
| 2019/0095123 | A1 | 3/2019 | Lin |
| 2019/0129834 | A1 | 5/2019 | Purkayastha et al. |
| 2019/0138445 | A1 | 5/2019 | Lee et al. |
| 2019/0391926 | A1 | 12/2019 | Lin |
| 2020/0073663 | A1 | 3/2020 | Simmons et al. |
| 2020/0073818 | A1 | 3/2020 | Inglis et al. |
| 2020/0073824 | A1 | 3/2020 | Inglis et al. |
| 2022/0156200 | A1 | 5/2022 | Simmons et al. |
| 2022/0253385 | A1 | 8/2022 | Inglis et al. |

FOREIGN PATENT DOCUMENTS

| | | | |
|---|---|---|---|
| WO | 2012052800 | A1 | 4/2012 |
| WO | 2019050418 | A1 | 3/2019 |

OTHER PUBLICATIONS

Inglis, et al., "Persistent Storage Device Management," filed Aug. 19, 2019, U.S. Appl. No. 16/544,605.

Inglis, et al., "Block Device Interface Using Non-Volatile Pinned Memory," filed Aug. 30, 2019, U.S. Appl. No. 16/556,575.

M. L. Curry, "A highly reliable GPU-based RAID system", (Doctoral dissertation), 2010.

R.A. Patel, et al., "Parallel lossless data compression on the GPU" 2012 Innovative Parallel Computer (InPar) 2012.

Foreign Communication From a Related Counterpart Application, Extended European Search Report dated Jan. 16, 2020, European Application No. 19194744.9 filed on Aug. 30, 2019.

Foreign Communication From a Related Counterpart Application, Partial European Search Report dated Jan. 30, 2020, European Application No. 19194748.0 filed on Aug. 30, 2019.

Anujan Varma et al: "Destage algorithms for disk arrays with non-volatile caches", ACM SIGARCH Computer Architecture News, ACM Special Interest Group on Computer Architecture, 2 Penn Plaza, Suite 701 New York NY 10121-0701 USA, vol. 23, No. 2, May 1, 1995 (May 1, 1995), pp. 83-95, XP058084661, ISSN: 0163-5964, DOI: 10.1145/225830.224042.

Anonymous: "CUDA 2.2 Pinned Memory APIs", Mar. 1, 2009 (Mar. 1, 2009), XP055655605, Retrieved from the Internet: URL: https://devtalk.nvidia.com/cmd/default/download-comment-attachment/50683/ [retrieved on Jan. 8, 2020].

Foreign Communication From a Related Counterpart Application, Extended European Search Report dated Jan. 27, 2020, European Application No. 19193027.0 filed on Aug. 22, 2019.

Office Action dated Mar. 1, 2021, U.S. Appl. No. 16/544,605, filed Aug. 19, 2019.

Final Office Action dated Jul. 8, 2021, U.S. Appl. No. 16/544,605, filed Aug. 19, 2019.

Notice of Allowance dated Jan. 18, 2022, U.S. Appl. No. 16/544,605, filed Aug. 19, 2019.

Notice of Allowance dated Feb. 18, 2021, U.S. Appl. No. 16/556,711, filed Aug. 30, 2019.

Office Action dated Sep. 25, 2020, U.S. Appl. No. 16/556,575, filed Aug. 30, 2019.

Final Office Action dated Apr. 12, 2021, U.S. Appl. No. 16/556,575, filed Aug. 30, 2019.

Office Action dated Apr. 22, 2021, U.S. Appl. No. 16/556,575, filed Aug. 30, 2019.

Notice of Allowance dated Oct. 15, 2021, U.S. Appl. No. 16/556,575, filed Aug. 30, 2019.

Office Action dated Jan. 20, 2023, U.S. Appl. No. 17/731,038, filed Apr. 27, 2022.

Office Action dated Dec. 20, 2022, U.S. Appl. No. 17/590,721, filed Feb. 1, 2022.

Inglis, et al., "Persistent Storage Device Management," filed Apr. 27, 2022, U.S. Appl. No. 17/731,038.

(56) References Cited

OTHER PUBLICATIONS

Simmons, Xavier Aldren, et al., "Vector Processor Storage," filed Feb. 1, 2022, U.S. Appl. No. 17/590,721.
Amendment filed Apr. 30, 2024, for U.S. Appl. No. 17/731,038, (filed Apr. 27, 2022), 12 pgs.
"Virtual memory", retrieved from: https://web.archive.org/web/20171223141405/https://en.wikipedia.org/wiki/Virtual_memory (Year: 2017), 9 pgs.
Final Office Action dated Jan. 13, 2021, for U.S. Appl. No. 16/556,575, (filed Aug. 30, 2019), 10 pgs.
Final Office Action dated Jul. 28, 2023, for U.S. Appl. No. 17/731,038, (filed Apr. 27, 2022), 29 pgs.
Foreign Communication from a Related Counterpart Application, European Examination Report dated Apr. 21, 2023, European Application No. 19194748.0 filed on Aug. 30, 2019, 10 pgs.
Notice of Allowance mailed Jun. 2, 2023, for U.S. Appl. No. 17/590,721 (filed Feb. 1, 2022), 9 pgs.
Notice of Allowance mailed May 26, 2021, for U.S. Appl. No. 16/556,711, (filed Aug. 30, 2019), 9 pgs.
Notice of Allowance mailed Nov. 1, 2021, for U.S. Appl. No. 16/556,711, (filed Aug. 30, 2019), 9 pgs.
Office Action dated Oct. 15, 2020, for U.S. Appl. No. 16/556,711, (filed Aug. 30, 2019), 15 pgs.

\* cited by examiner

BLOCK DEVICE INTERFACE USING NON-VOLATILE PINNED MEMORY

CROSS-REFERENCE TO RELATED APPLICATIONS

The present application is a continuation of U.S. application Ser. No. 16/556,575, filed Aug. 30, 2019 (now issued as U.S. Pat. No. 11,263,144), and claims priority to U.S. Provisional Application No. 62/746,981, filed Oct. 17, 2018, as well as U.S. Provisional Application No. 62/725,703, filed Aug. 31, 2018, and U.S. Provisional Application No. 62/725,691, filed Aug. 31, 2018, all of which are incorporated herein by reference in their entirety for all purposes.

FIELD

This relates to a block device interface using non-volatile pinned memory.

BACKGROUND

Data may be stored on persistent storage devices. A driver can provide an interface to allow data to be written to and read from the persistent storage devices.

SUMMARY

In a first example embodiment, there is provided a method comprising: receiving, at a block device interface, an instruction to write data, the instruction comprising a memory location of the data; copying the data to pinned memory; performing, by a vector processor, one or more invertible transforms on the data; and writing the data from the pinned memory to one or more storage devices asynchronously; wherein the pinned memory of the data corresponds to a location in pinned memory, the pinned memory being accessible by the vector processor and one or more other processors.

In a second example embodiment, there is provided a method comprising: receiving, at a block device interface, an instruction to read data from one or more storage devices; writing the data from one or more storage devices to a memory location; and performing, by a vector processor, one or more invertible transforms on the data at the memory location; wherein the memory location of the data corresponds to a location in pinned memory, the pinned memory being accessible by the vector processor and one or more other processors.

BRIEF DESCRIPTION

The description is framed by way of example with reference to the drawings which show certain embodiments. However, these are provided for illustration only.

DETAILED DESCRIPTION

In some embodiments, an instruction to write data is first received at a block device interface. The instruction comprises a memory location of the data to be stored. This memory location may be in pinned memory, which is memory accessible by a vector processor and one or more other processors. The vector processor can then perform one or more invertible transforms on the data. The data is then asynchronously written from the memory location in pinned memory to one or more storage devices.

In this case, "asynchronously" refers the data being written to the memory and the data being written to the one or more storage devices not necessarily being immediately sequential. That is, once the data is written to the memory, some amount of time may pass before the data is written to the one or more storage devices. In some instances, this may be immediate, but it is not necessary that this occurs. This contrasts with synchronous writing in which when the data is written to the memory, the data is simultaneously (or immediately afterwards) written to one or more storage devices.

Pinned Memory

Pinned memory is a portion of memory which is accessible by multiple types of processor via direct memory access. In some cases, pinned memory may be unified memory which is physically located in main memory. Pinned memory may be accessible by a vector processor (such as a GPU) and one or more other processors (such as a CPU) directly over a bus. In this way, both processors may operate on the same data in memory without any need for the memory to be copied. This may be called "zero-copy".

This can be contrasted by non-pinned memory which requires data to be copied to memory associated with each processor or processor type. For example, if data was stored in memory associated with a CPU, the data would need to be copied to memory associated with the GPU before the GPU could process the data.

Utilizing pinned memory can therefore decrease the overhead when switching between processors or processor types.

In some embodiments, the pinned memory is physically part of non-volatile memory, comprising one or more non-volatile memory chips. In this regard, "non-volatile" may be considered to mean that the memory maintains the stored data even without power. This contrasts with volatile memory in which power must be maintained constantly for the data to be retained.

The pinned memory may be configured as a write-back cache. This may be considered a cache in which data is kept in the cache until the data is about to be overwritten in the cache with new data (or at least for some substantial period). That is, data may be written from the cache to the storage devices as late as possible.

The memory typically provides a much faster write speed than the underlying storage devices. Thus, by deferring writing to the storage devices, the slower speed of the storage devices does not delay the write speed. Moreover, repeated writes of the data already in the memory can be fast, since there is no need to retrieve the data from the storage devices.

Because the cache is non-volatile, the data is not lost if there is a power failure. The cache may even be moved into a separate system for recovery if necessary. This can reduce the risk of maintaining data in memory for a substantial period.

These approaches therefore provide a significantly improved write speed with minimal risk of data loss.

Interface

In use, an interface may be provided for use by programs or the system. The interface may be a block device driver. A block device driver is a driver configured to allow interaction with an underlying device that operates in fixed-size blocks. For example, storage devices typically operate in blocks of 512 bytes or 4096 bytes. The system can then interact with the storage device (for example, by writing data to the device or reading data from the device) using a block device driver.

In some cases, there may be no single underlying device. Instead, the interface may operate on the basis of a meta-device. A meta-device can be presented as if it were a device from the point of view of a program using the interface.

However, the meta-device may be mapped to one or more storage devices which are hidden from the program. For example, the driver may translate a request to store data on a single meta-device into storing the data in a stripe across all the devices. In this way, the driver can hide the hardware details.

The interface may be provided as a driver running on one or more CPUs. Additionally or alternatively, the interface may run as a long-running kernel on a vector processor such as a GPU. This would allow kernels running on the vector processor to interface directly with the interface without the mediation of a CPU.

Writing

Figure 1:
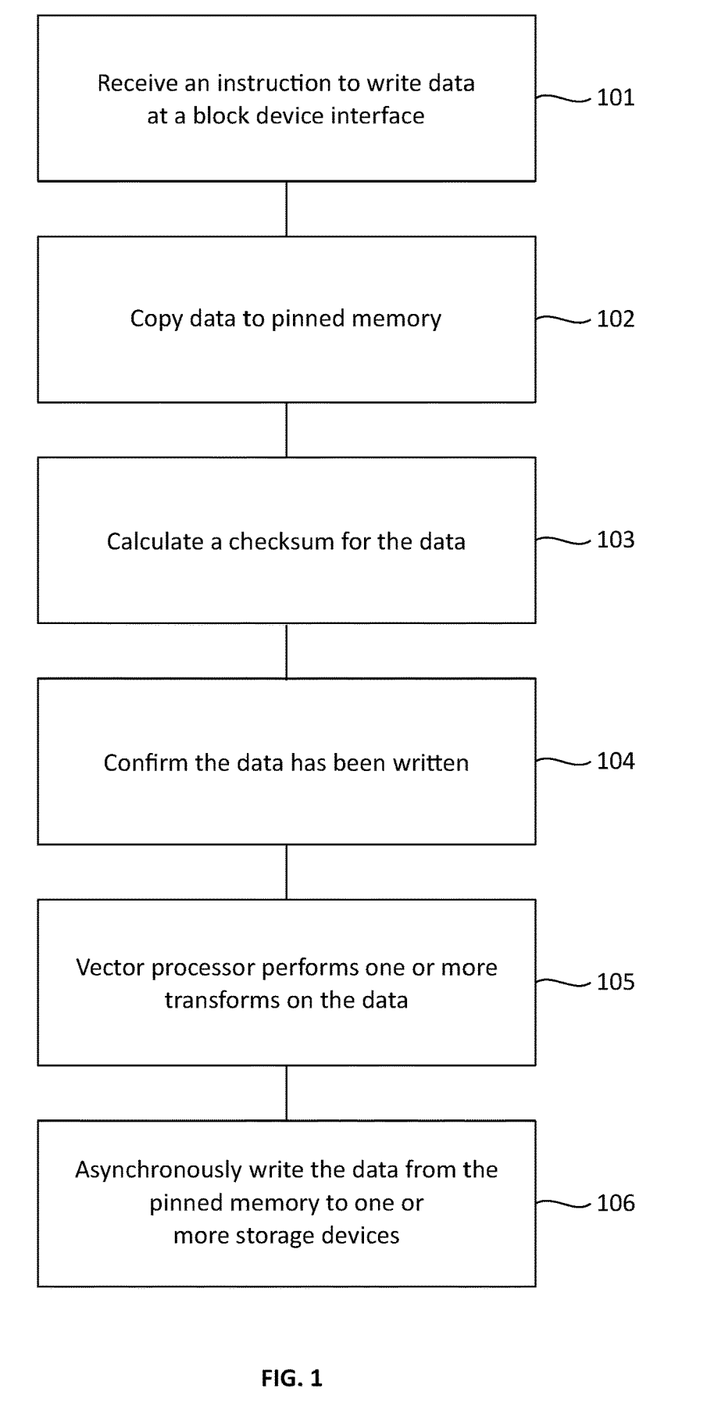
FIG. 1 shows an example approach for using pinned memory in writing data.

FIG. 1 shows an example approach for how the pinned memory can be used in writing data.

At step 101, the block device interface receives an instruction to write data. The instruction to write data may be received as a function call of the interface. The data may be specified in the instruction with reference to a memory location. The instruction to write data may also comprise a destination at which the data should be written. This may be a reference to a location on one or more of the storage devices.

The memory location of the data may correspond to a location in pinned memory. That is, the data is stored in a memory location which is accessible by the vector processor and by one or more other processors. In this manner, the driver may be running on the vector processor or another processor (such as a CPU).

However, in some cases, the memory location may be in main memory (that is, memory not accessible by a vector processor).

At step 102, the data is copied to pinned memory.

During the copy process, one or more transforms may be performed to the data. For example, one transform may involve encrypting or encoding the data. This may allow the data in pinned memory to be encrypted or encoded, even if the data in main memory is unencrypted or unencoded. Such transforms may be relatively fast so as to not materially delay a write process.

Step 102 may only occur where the memory location in the instruction is not in pinned memory. That is, step 102 may be omitted where the data indicated in the request is already in pinned memory.

At step 103, a checksum for the data is calculated. The purpose of the checksum is to verify that the data which was written is the data that is subsequently retrieved. This can avoid the risk of bitrot, or otherwise of the data unexpectedly changing. The checksum may be a cryptographic hash, such that there is an extremely low probability that a change in the data would be unnoticeable. Once calculated, the checksum can then be stored in the cache, for example at the same location as the data.

The checksum calculation may be relatively fast so as not to materially delay a write process.

In some cases, step 103 may be omitted. For example, in some implementations, a checksum may be seen as unnecessary or the overhead associated with a checksum may be regarded as undesirable.

At step 104, the data is confirmed as having been written. This may involve returning a success value to the sender of the instruction, for example. In some cases, this may comprise confirming that the data has been written to the destination location specified in the instruction. In this way, the use of the cache is transparent to the user. From the user's point of view, the data has been stored at the specified storage device. This provides for compatibility and encapsulates the complexity which may otherwise be associated with using a cache.

Step 104 may be particularly beneficial where the pinned memory corresponds to non-volatile memory. Because non-volatile memory is resistant against power loss, once the data has been written to the non-volatile memory, there may be a negligible chance of data loss. Thus by confirming that data has been written before the data has actually been written to the persistent storage device, this can provide a very fast data throughput without underlying risk of data loss.

At step 105, the vector processor performs one or more transforms on the data. These transforms can be invertible transforms, such that the original contents can be recovered by performing an inverse function. For example, encryption, encoding, compression, deduplication, and the addition of further information are usually invertible functions, since the original information can be obtained by an inverse function. The transforms may be performed in a predetermined order. For example, encryption may be performed before encoding.

Because these transforms occur after the data is confirmed as having been written at step 104, this does not cause a delay in the write process from the point of view of a user. This may allow relatively robust computationally intensive transforms to be performed without leading to a reduction in perceived write speed.

One transform may be to encrypt the data. This can be performed using RSA, AES, or any other appropriate encryption algorithm. This may avoid the data being read if the underlying storage devices are compromised.

Another transform may be to encode the data by adding parity information to the data through use of an error correcting code before splitting the data into data fragments. This allows for the original data to be recreated based on the fragments even if some fragments are erroneous. This error correcting code may be an erasure code, which allows for recreating the original data even if some of the fragments are entirely lost.

A Reed-Solomon code is an example of an erasure code. A piece of data, such as a block, is encoded using the Reed-Solomon algorithm to form a number of codewords. Each codeword comprises n symbols: k of these carry information from the original data, and the remaining are computed and can be used to reconstruct the original data. Each codeword can be broken up to form a data fragment. The parity n-k may be selected based on the type of data, system default, user preference or any other suitable approach. Because of how Reed-Solomon codes work, even if up to n-k fragments are lost, the original data can still be obtained.

For example, for a Reed-Solomon code using 2:1 parity, there is 1 unit of parity information added for every 2 units of original data. This means that even if 1 fragment is lost, the original data can be regenerated from any 2 other fragments. 15:5 parity refers to there being 5 units of parity added for every 15 units of original data. If any 5 fragments are lost, the original data can be regenerated from any 15 of the 20 remaining fragments.

Thus the vector processor may encode the data to form n data fragments, such that any k of the data fragments can be used to regenerate the data, k being less than or equal to n.

Higher parity typically means that a greater number of data fragments can be lost before the data is unrecoverable. In addition, a higher ratio of parity data to actual data may reduce the overall quantity of data that is stored for a given resilience. However, higher parity typically tends to exponentially increase the level of computation required for encoding.

In addition, this may include computing a cryptographic or non-cryptographic hash based on the data, and encoding this as part of the data.

A further transform may be to log the storage event in an event log. This may include a timestamp and a cryptographic hash of the data. While logging does not affect the data being stored, it can be treated as a transform of the data for the purpose of the order of transforms.

In some cases, the dictionary-based data compression methods described by PCT publication no. WO 2019/040418 may be used.

By using a vector processor to perform the transforms, relatively high-quality transforms can be performed more efficiently compared to using a CPU. For example, in the case of encoding, a high level of parity may be used. In addition, this can be done in substantially real-time, so that the transforms do not materially delay the storage process (for example, by adding less than a few milliseconds of time to storage, for example).

In some cases, the pinned memory is configured to operate as a write-back cache.

In writing the data, the driver will determine a location in the cache at which the data should be written. If there is unused space in the cache, the data may be written there. If there is no unused space, the driver may move some of the existing data from the cache and to the one or more storage devices.

Once a location in the cache has been determined, the data is written to the cache at this location.

Metadata at the driver (or within the cache) may be updated to reflect this. For example, a mapping may be updated to show that the data intended to be stored at the destination location in the instruction is stored at the respective location in the cache. In addition, the location in the cache may be marked as dirty to indicate that the data stored there cannot be overwritten without being moved to one or more storage devices first.

At step 106, the driver asynchronously writes the data from the pinned memory to one or more storage devices.

This may occur in response to the driver determining that data must be moved from the cache to the storage devices. The driver may rely on one or more heuristics for this. For example, the driver may select the data to be moved based on one or more of how old it is, how recent it was used, and how likely it is to be used.

This is asynchronous, so there may be a substantial time period between steps 105 and 106. Step 106 may only be performed when the new data is needed to be written to the cache. In this way, the cache operates in a "lazy write" paradigm. Alternatively, in some cases the data may be immediately moved from the cache, for example where the data written is heuristically determined to be the best data to be moved.

The driver writes the data to one or more of the storage devices. The one or more storage devices may be those specified in the initial instruction received at step 101 and recorded in metadata.

Because step 106 is performed subsequently and asynchronously to step 103, the delays associated with typical storage devices are not apparent to a user in ordinary use. That is, the driver provides the appearance of data being stored at the much higher cache speed, rather than the lower storage device speed.

But particularly where the cache is non-volatile, this does not necessarily introduce any great risk of data loss. In addition, the use of non-volatile memory can mitigate or eliminate the "write hole" phenomenon. That is, in the case of volatile memory, if there is power loss during the transfer of data from the memory to a storage device, it can be impossible to determine if the data on disk was correctly transferred from memory. However, with non-volatile memory, the transfer process can resume without data loss when power is restored.

Thus the user may receive a higher performance write without any substantial disadvantages.

Cleaning

As noted in step 106, the driver selectively moves data from the cache to the one or more storage devices when new data is needed to be written.

Once a block of the cache is determined to be cleaned, the data is moved to one or more storage devices.

Figure 2:
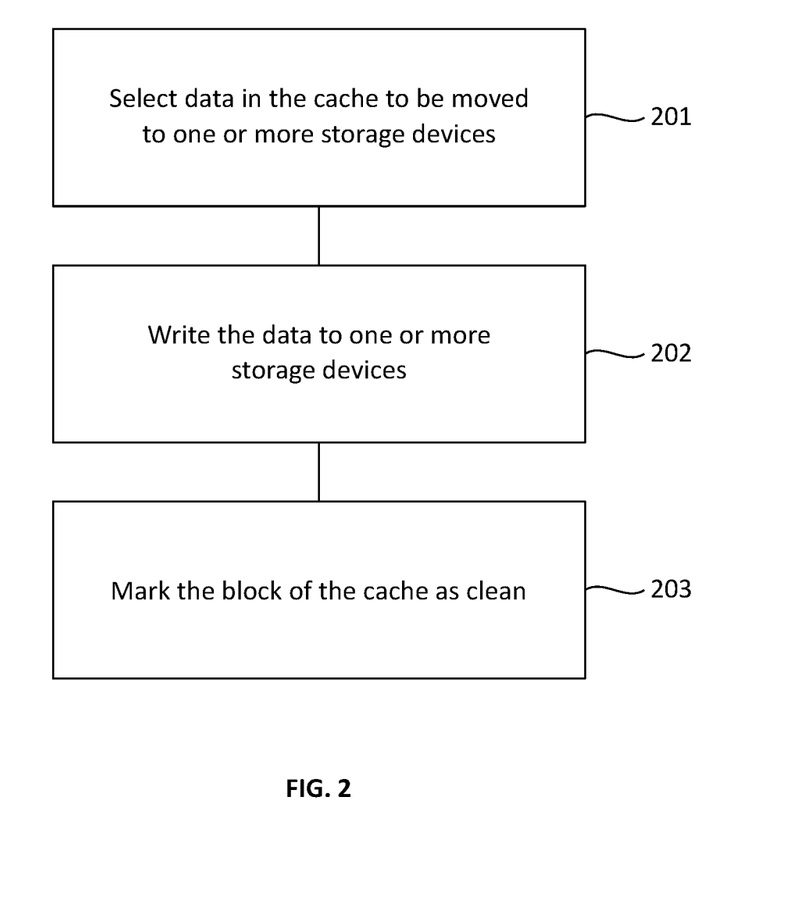
FIG. 2 shows an example approach for writing data from the write-back cache to one or more storage devices.

FIG. 2 shows an example approach for writing data from the write-back cache to one or more storage devices. This may be used to implement step 105.

At step 201, the driver selects the data at one or more blocks of the cache to be moved to one or more storage devices. The selection of the data in the cache to be moved may be made according to a heuristic using a number of variables. For example, this may be based on the age of the data, the most recent use of the data, the expected likelihood of use of the data, or the relationship between the data at the blocks.

At step 202, the driver writes the data to one or more storage devices. This may occur in a conventional manner by the driver interacting with a storage controller of the one or more storage devices.

The selection of the one or more storage devices may be based on metadata previously stored for the data to be moved. That is, when the data was initially stored in the cache, metadata may have been updated to map between the cache location of the data and the eventual storage device location of the data. In such a case, this storage device location may be used to select the one or more storage devices.

At step 203, after the data has been written to the one or more storage devices, the driver marks the corresponding blocks of the cache as clean. This allows that part of the cache to be reused. The driver may also update the metadata to show that the data is no longer stored in the cache, for example by removing a mapping between a location in the cache and the data.

In this way, data is moved from the cache to the one or more storage devices when necessary.

In some cases, the cache may be configured to retain a certain level of clean capacity. That is, data may be moved from the cache so that the cache can store a predetermined quantity of data without moving data. For example, it may be that 50% of the overall capacity of the cache should be retained as clean. This allows for improved burst performance in writing, while still allowing the improved read and modify performance for data already in the cache.

Partitioning

As noted above, the non-volatile write-back cache may be treated as a common resource available to all users. However, in some cases, a single user may monopolize the cache by writing a large amount of data at once. Once the cache is full, other users may not see the benefits To mitigate this risk, the non-volatile write-back cache may be partitioned by source (such as user, or group of users). Each partition can then operate independently for caching and capacity purposes.

Figure 3:
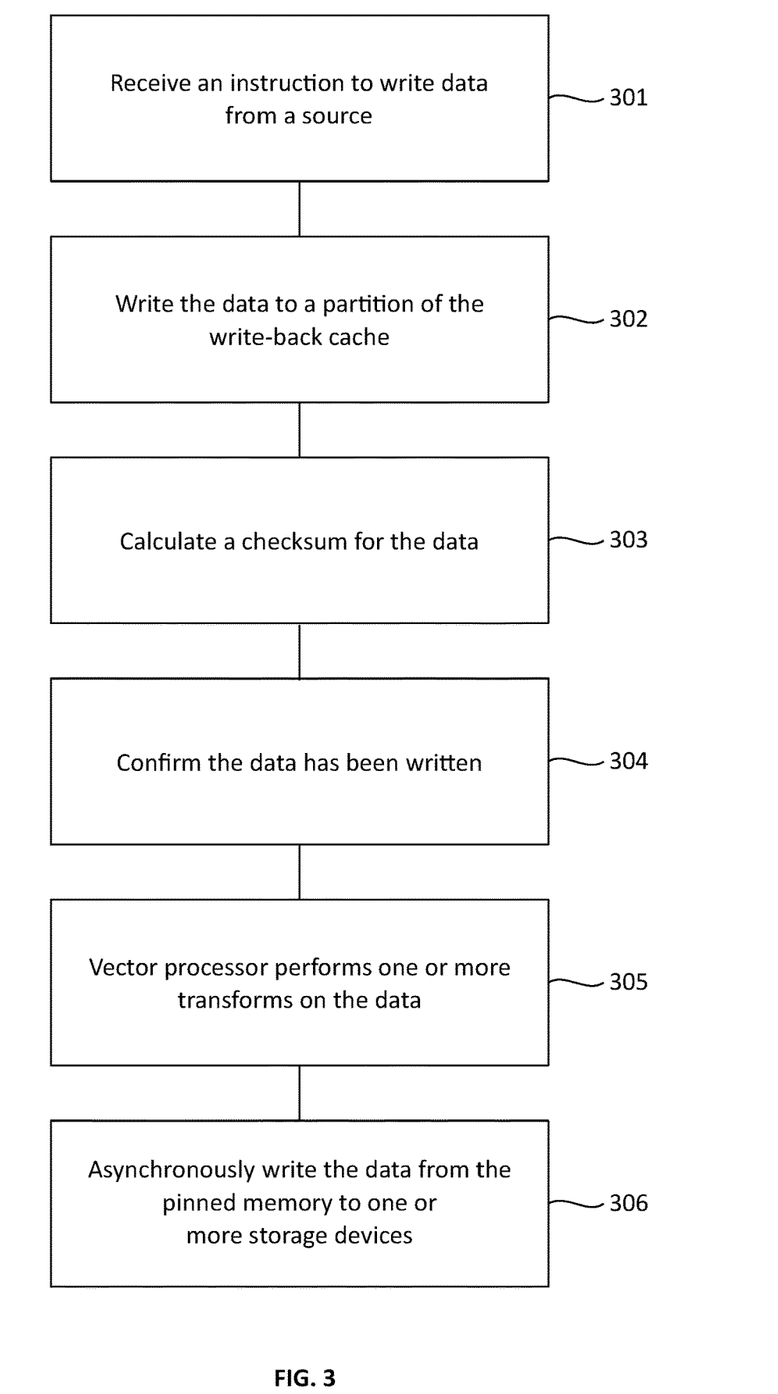
FIG. 3 shows an example of the use of a partitioned cache.

FIG. 3 shows an example of the use of a partitioned cache.

At step 301, the driver receives an instruction to write data. This may be the same as step 101. However, in this case, the instruction specifies a source of the instruction (such as a user or user group).

At step 302, the driver writes the data to a partition of the write-back cache, where the partition is associated with the source. This may be the same as step 102, except that the data is only written to that partition. If the partition has insufficient clean space, data will be moved out of that partition to the one or more storage devices (even if all other partitions in the cache are unused).

At step 303, the driver calculates a checksum for the data. The checksum can then be stored in the partition of the cache. This may be the same as step 103, except that the checksum may only be written to that partition.

At step 304, the driver confirms that the data has been written. This may be the same as step 104.

At step 305, the vector processor performs one or more invertible transforms on the data. This may be the same as step 105.

At step 306, the driver asynchronously writes the data from the pinned memory to one or more storage devices. This may be the same as step 106.

In this manner, the effect of a single source (such as a single user or user group) on the cache is substantially limited to their partition. This can preserve a high level of quality of service for multiple users, and avoids general performance degradation in response to bursts.

Reading

Figure 4:
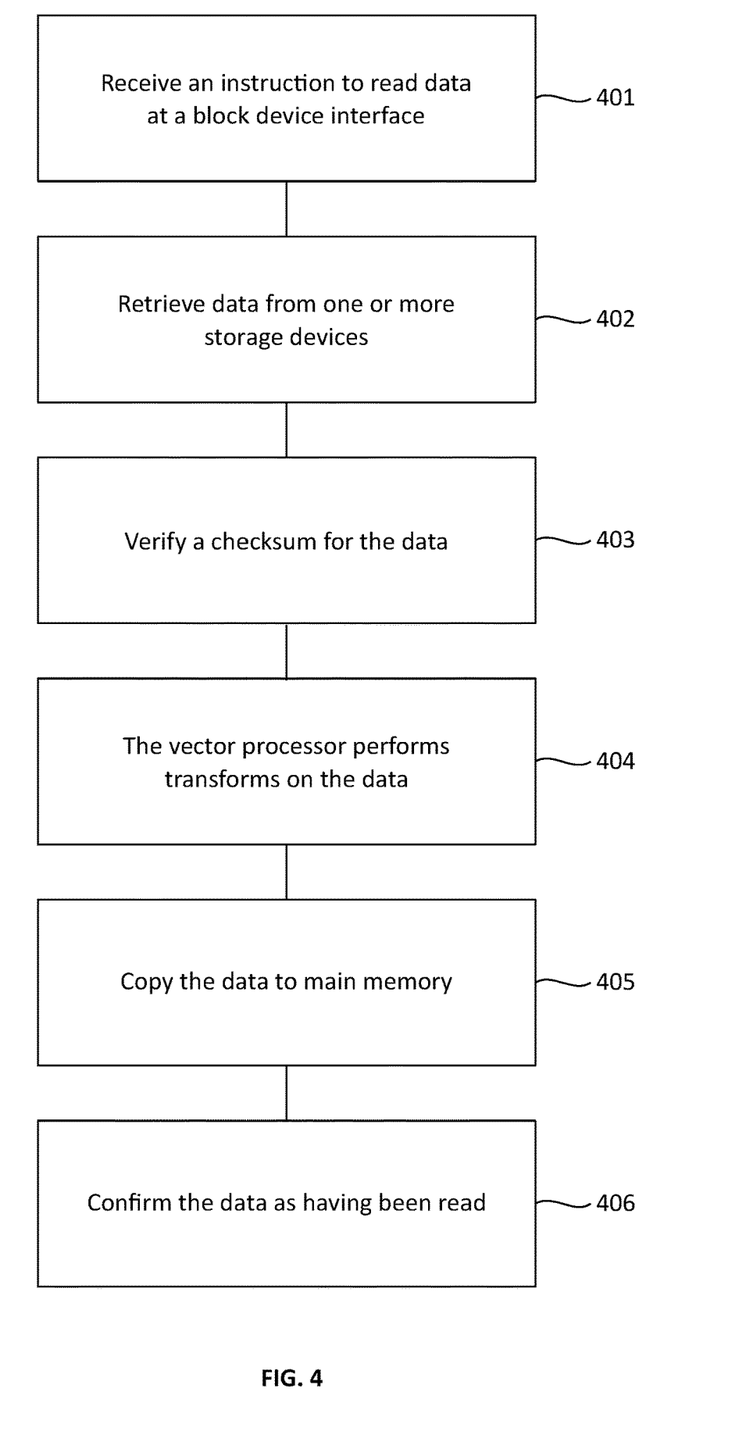
FIG. 4 shows an example approach for using pinned memory in reading data.

FIG. 4 shows an example approach for how the pinned memory can be used in reading data. This is complementary to the approach shown in FIG. 1.

At step 401, the block device interface receives an instruction to read data from one or more storage devices. The instruction to read data may be received as a function call of the interface. The instruction may specify the data with reference to a location on one or more storage devices or with reference to a meta-device.

At step 402, the data is retrieved from the one or more storage devices to the memory location. Where the block device interface corresponds to a meta-device, this may comprise retrieving the data from the underlying physical storage devices.

The memory location of the data corresponds to a location in pinned memory. That is, the data is stored in a memory location which is accessible by the vector processor and by one or more other processors. In this manner, the driver may be running on the vector processor or another processor (such as a CPU).

At step 403, a checksum for the data is calculated. This can be compared to a previously calculated checksum for the data. This verifies that the data retrieved from the storage device is the same as the data that was stored at the storage device. In some cases, step 403 may be omitted. For example, in some implementations, verifying a checksum may be seen as unnecessary or the overhead associated with verifying a checksum may be regarded as undesirable.

At step 404, the vector processor performs one or more transforms on the data. These transforms may be the inverse of transforms performed at step 102 to recover the original data. For example, decryption, decoding, decompression, un-deduplication, and the removal of further information may be performed to invert the transforms performed at step 102. The transforms may be performed in a predetermined order. For example, decoding may be performed before decryption.

At step 405, the data is copied to main memory.

This avoids the pinned memory being taken up unnecessarily. However, in some cases, step 405 may be omitted.

At step 406, the data is confirmed as having been read. This may involve returning the memory location to the sender of the instruction, for example.

In this way, data stored using the approach of FIG. 1 may be retrieved.

System

Figure 5:
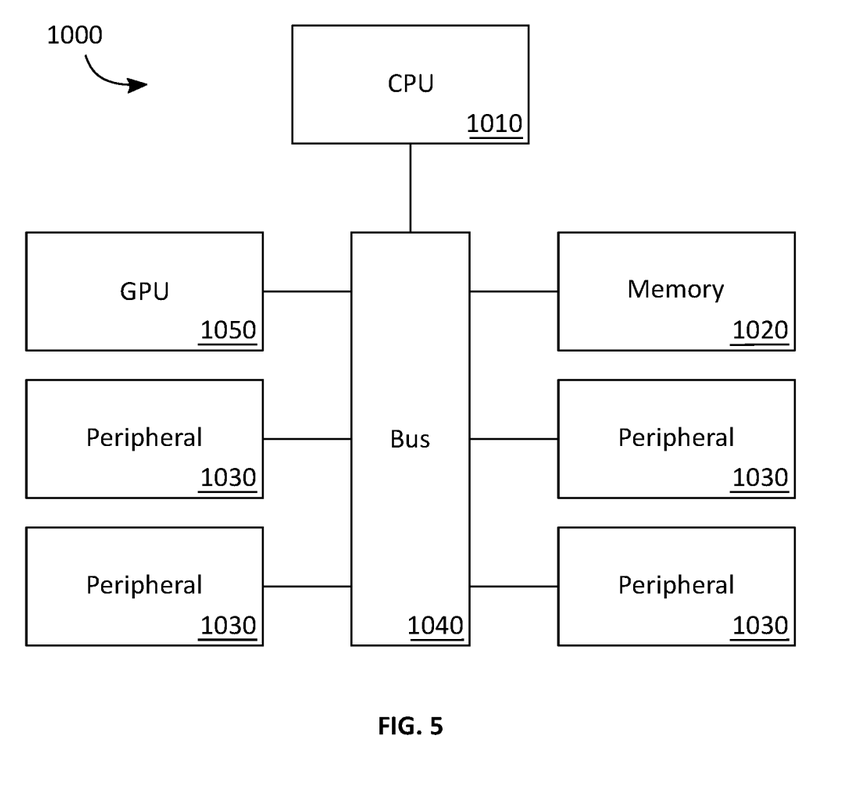
FIG. 5 shows an example system.

FIG. 5 shows an example system which may be used to implement the methods noted above.

The system 1000 comprises a CPU (central processing unit) 1010, a main memory 1020, one or more peripherals 1030, and a GPU (graphics processing unit) 1050. The CPU 1010, main memory 1020, peripherals 1030, and GPU 1050 are connected by a bus 1040. In the case of a PCIe (PCI Express) topology, the bus 1040 includes a root complex, and each of the peripherals 1030 and the GPU 1050 are PCIe endpoints. The GPU 1050 can communicate with the peripherals 1030 directly via the bus 1040. In some cases, more than one CPU 1010 and/or more than one GPU 1050 is provided.

The main memory 1020 comprises non-volatile memory chips configured to operate as a non-volatile write-back cache. This may involve the use of flash memory alone or in combination with conventional volatile memory. The non-volatile memory chips may be configured as non-volatile dual in-line memory module (NVDIMM). The main memory 1020 may further comprise conventional volatile memory, which is not used as the non-volatile write-back cache.

In some cases the main memory 1020 comprises one or more pairs of non-volatile memory modules, such as a pair of NVDIMMs. In use, data written to one of the non-volatile memory modules is mirrored on the other. This can provide a level of resilience in case of data loss: each non-volatile memory module contains the full set of data in the cache.

When one of the pair is replaced, the data may then be automatically mirrored to the new module. This allows for a simple process for expanding the cache. A first module of the pair can be replaced with a new larger one. Once the automatic mirroring is completed, the second module of the pair can then be replaced with a new larger one. This results in the cache being expanded (to the new larger size) without any loss of data or functionality.

In some cases, one or more of the non-volatile memory modules may be spanned, such that blocks are alternated between them. Spanning and mirroring may be combined. For example, of four non-volatile memory modules, a first and second module may be spanned, the first and second module may be mirrored to the third and fourth module.

The peripherals 1030 may include persistent storage devices (such as hard disk drives, solid state drives, or the like), storage controllers (such as RAID controllers), network controllers (such as network interface cards), switches (such as PCIe switches configured to connect further peripherals), or any of a variety of devices.

A typical characteristic of the main memory 1020 and any storage devices is that main memory tends to be much faster for a random write. Thus writing a unit of data to main memory can typically be resolved much more quickly than writing a unit of data to a storage device. However storage devices tend to be cheaper and larger, and are thus better for general long-term storage purposes.

The peripherals 1030 and the GPU 1050 may have access to the main memory 1020 via the bus 1040. Through DMA (direct memory access), this can allow the peripheral 1030 or the GPU 1050 to read data to and write data from the main memory. This may involve copying the data from main memory 1020 to a memory local to the peripheral 1030 or the GPU 1050.

In some cases, the memory space for the CPU 1010 and the GPU 1050 can be shared via unified virtual memory. This allows for a pointer to a single memory address to be passed between the CPU and the GPU without the need to copy data between a main memory 1020 and a local memory.

Computer system 1000 may be used to implement the methods noted above. For example, CPU 1010 or GPU 1050 may run a program which operates as a driver to one or more of the storage device peripherals 1030.

Vector Processor

A vector processor is a processor in which instructions are executed on an array of data. This can be contrasted to conventional CPUs which are scalar and execute an instruction on a single data item. This can allow a vector processor to process a large quantity of data much more quickly than a conventional, scalar CPU.

One example of a vector processor is a GPU. However, a vector processor may be implemented in other forms, such as a field programmable gate array (FPGA).

Figure 6:
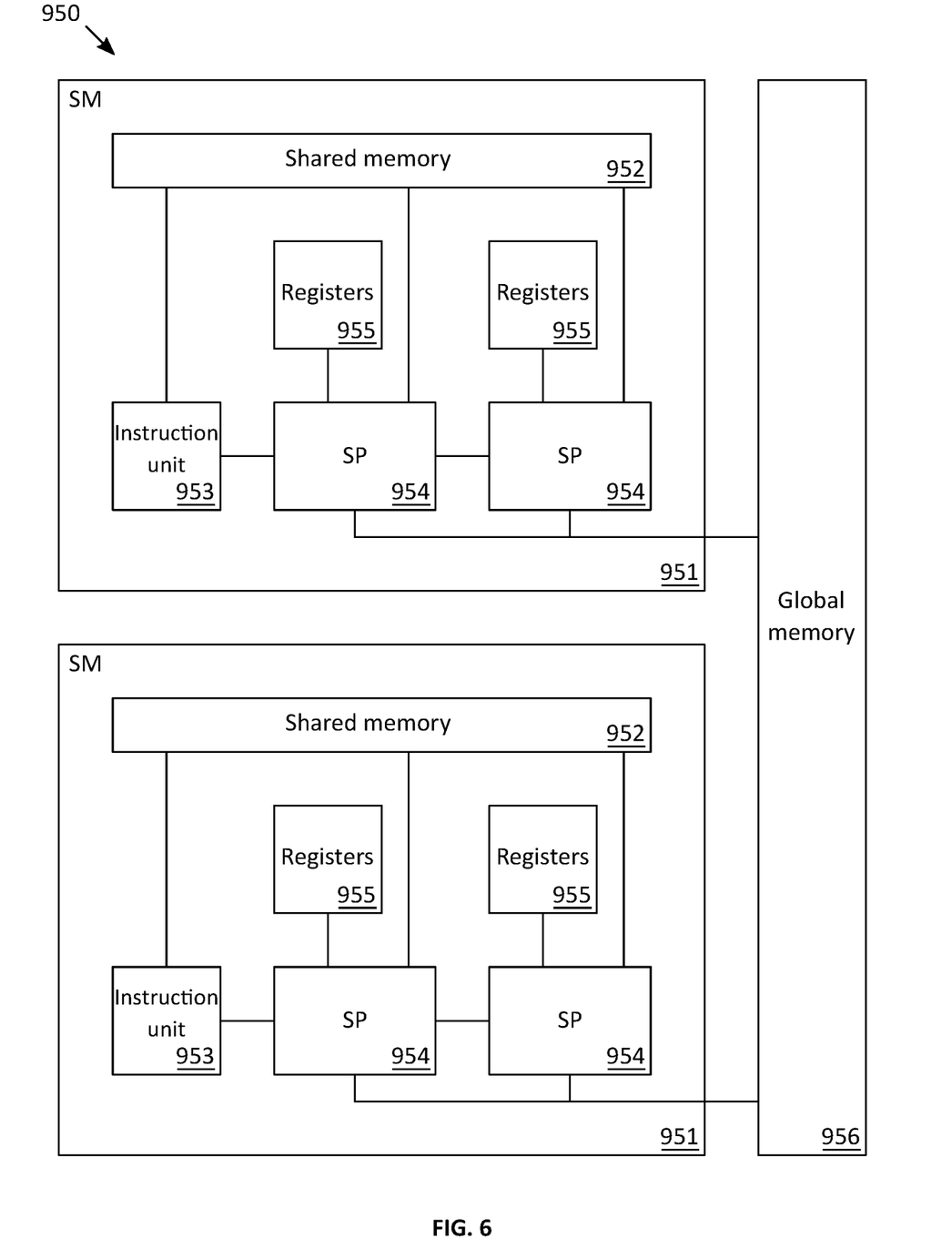
FIG. 6 shows an example GPU.

An example GPU 950 which operates as a vector processor is shown in FIG. 6. Such a GPU 950 may be used as the vector processor in any of the approaches noted above.

The GPU 950 comprises a number of SMs (streaming multiprocessors) 951, typically between 1 and 30. Each SM 951 has a shared memory 952 and an instruction unit 953.

Each SM 951 comprises a number of SPs (streaming processors) 954, for example 8. Each SP 954 has access to the shared memory 952 and has a set of registers 955. Each SP 954 may also have access to a global memory 956 of the GPU. This global memory 956 may be mapped to main memory 1020 of the computer system.

The SPs 954 within an SM 951 receive instructions from the same instruction unit 953. In this way, each SP 954 within an SM typically processes the same instruction at the same time.

The GPU 950 can be configured to run a kernel, which may be a program or function. The kernel may make use of the CUDA platform. Kernels are commonly relatively short-lived (that is, on the order of seconds), as a watchdog timer may kill a kernel if it runs beyond a preset threshold. However, in some cases a kernel may be long-running, in that it can execute indefinitely until execution finishes. Although a kernel runs on a GPU, it is typically initiated by a local or remote CPU.

A kernel is executed by GPU 950 executing a grid corresponding to the kernel. A grid consists of a number of blocks. There is typically no synchronization between blocks in a grid.

Each SM 951 can execute a block of the grid. Typically, an SM 951 can execute multiple blocks at the same time.

The number of blocks on an SM 951 may be limited by the capacity of the shared memory 952. Typically, a block does not move from one SM 951 to another SM 951 during the execution of the kernel.

Each SP 954 can execute a thread of the block. In some cases, one SP 954 can handle multiple threads at the same time. A thread is typically a computation comprising a number of instructions. Each instruction may take a number of cycles to perform, for example 4. Because of this latency, an SP 954 can execute multiple threads at once. That is, while one thread is being executed, another thread can be started. Threads may communicate with one another via shared memory 952 of the SM 951.

The GPU 950 may have a SIMD (single instruction, multiple data) architecture. This means that a GPU 950 may operate on the basis of warps. Each warp comprises a number of threads within a block which execute the same instruction in lockstep, though optionally on different data. For example, each thread in a warp may execute an addition instruction to the numbers stored at different memory addresses. In addition, each thread within a warp may be configured to fetch data from memory at the same time.

A warp is resident on an SM 951, such that each thread in a warp may be executed by a different SP 954 within an SM 951. The warp size (that is, the number of threads within a warp that can be executed in lockstep) may be a predetermined value, such as 32. An SM 951 may have multiple resident warps.

In this way, a single kernel can utilize the capacity of the numerous processors available on a GPU. This can result in a kernel being executed significantly more quickly in comparison to other processing units.

Interpretation

A number of methods have been described above. It will be appreciated that any of these methods may be embodied by a series of instructions, which may form a computer program. These instructions, or this computer program, may be stored on a computer readable medium, which may be non-transitory. When executed, these instructions or this program may cause a processor, such as a CPU or GPU, to perform the described methods.

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors. In some cases, one step may be performed by a first type of processor (for example, processing of large sets of data may be performed by a GPU) and another step may be performed by a second type of processor (such as metadata lookup being performed by a CPU).

The order of steps within methods may be altered, such that steps are performed out of order or in parallel, except where one step is dependent on another having been performed, or the context otherwise requires.

The term "comprises" and other grammatical forms is intended to have an inclusive meaning unless otherwise noted. That is, they should be taken to mean an inclusion of the listed components, and possibly of other non-specified components or elements.

While the present invention has been explained by the description of certain embodiments and with reference to the drawings, the invention is not intended to be restricted to such details. Additional advantages and modifications will readily appear to those skilled in the art. Therefore, the invention in its broader aspects is not limited to the specific details, representative apparatuses and methods, and illustrative examples shown and described. Accordingly, departures may be made from such details without departure from the spirit or scope of the general inventive concept.

The invention claimed is:

1. A method comprising:
   receiving, at a block device interface, an instruction to write data, the instruction comprising a memory location of the data;
   copying the data to pinned memory;
   indicating to a sender of the instruction that the data in the pinned memory has been written to one or more storage devices before performing one or more invertible transforms on the data;
   performing, by a vector processor, the one or more invertible transforms on the data to generate transformed data;
   writing the transformed data to the pinned memory; and
   initiating a transfer of the transformed data from the pinned memory to the one or more storage devices in response to a block device driver determining that the transformed data must be moved from the pinned memory to the one or more storage devices,
   wherein contents of the pinned memory are accessible by the vector processor and a central processing unit (CPU) directly over a data bus.

2. The method of claim 1, wherein the pinned memory is configured as a write-back cache.

3. The method of claim 2, further comprising:
   determining that a part of the write-back cache associated with the transformed data is dirty;
   writing the transformed data to the one or more storage devices; and
   marking the part of the write-back cache as clean.

4. The method of claim 2, wherein the write-back cache comprises a plurality of partitions, each partition being associated with a source.

5. The method of claim 1,
   wherein the pinned memory comprises a plurality of memory units, and
   wherein the transformed data in the pinned memory is located in each of the plurality of memory units.

6. The method of claim 5, wherein the plurality of memory units comprises one or more pairs of non-volatile dual in-line memory modules (NV-DIMMs).

7. The method of claim 5, further comprising:
   determining that a first one of the plurality of memory units has been replaced; and
   mirroring the data from a second one of the plurality of memory units to the first memory unit.

8. The method of claim 1, wherein the block device interface comprises a block device interface for a meta-device corresponding to the one or more storage devices.

9. The method of claim 2,
   wherein receiving an instruction to write data comprises receiving an instruction to modify data stored on the one or more storage devices and reading the data stored on the one or more storage devices to the write-back cache, and
   wherein writing the data to a the write-back cache comprises modifying the data in the write-back cache based on the instruction.

10. The method of claim 1, further comprising providing the block device interface.

11. The method of claim 1, wherein performing, by the vector processor, the one or more invertible transforms on the data comprises one or more of encryption, encoding, compressing, deduplicating, or logging.

* * * * *